No. 669,715. Patented Mar. 12, 1901.
H. G. VOIGHT.
RACK AND PINION DOOR BOLT.
(Application filed Jan. 4, 1901.)

(No Model.)

Witnesses
B. C. Woodford.
P. J. Egan

Inventor
Henry G. Voight.
By James Shepard
Atty.

UNITED STATES PATENT OFFICE.

HENRY G. VOIGHT, OF NEW BRITAIN, CONNECTICUT, ASSIGNOR TO THE RUSSELL AND ERWIN MANUFACTURING COMPANY, OF SAME PLACE.

RACK-AND-PINION DOOR-BOLT.

SPECIFICATION forming part of Letters Patent No. 669,715, dated March 12, 1901.

Application filed January 4, 1901. Serial No. 42,113. (No model.)

*To all whom it may concern:*

Be it known that I, HENRY G. VOIGHT, a citizen of the United States, residing at New Britain, in the county of Hartford and State of Connecticut, have invented certain new and useful Improvements in Rack-and-Pinion Door-Bolts, of which the following is a specification.

My invention relates to improvements in rack-and-pinion door-bolts; and the objects of my improvement are simplicity and economy in construction and efficiency in use.

Figure 1:
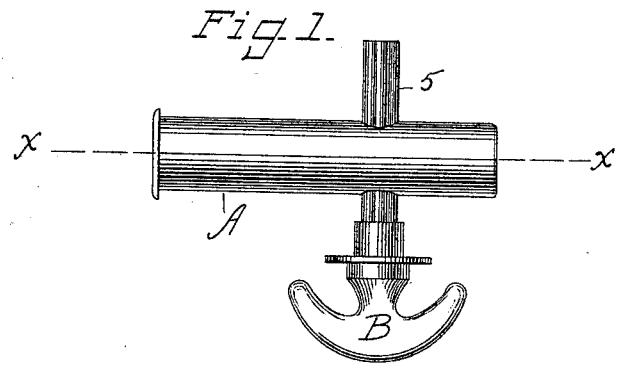
Figure 2:
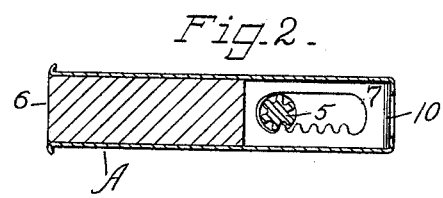
Figure 3:
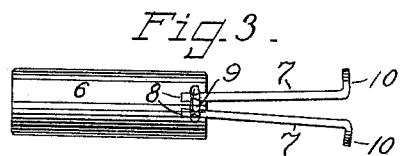
Figure 4:
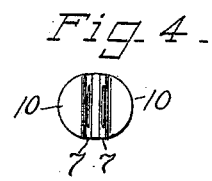

In the accompanying drawings, Figure 1 is a plan view of my door-bolt. Fig. 2 is a longitudinal section thereof on the line $x\ x$ of Fig. 1. Fig. 3 is a plan view of the bolt without the case; and Fig. 4 is an end view of the same, showing the inner end.

The case A and the thumb-turn B, with its pinion-like shank 5, are of an old and well-known form, and therefore need not be further described.

The bolt is formed of a plain cylindrical body 6 and a double rack consisting of two separately-formed sheet-metal members 7. I prefer to secure the rack members 7 to the body 6 by providing the inner end of the said body with slots 8, into which the ends of the rack members are placed and secured by setting down the metal over their edge, as at 9, Fig. 3. The heels or extreme inner ends of the rack members are turned outwardly to form lateral wings 10 with rounded edges. They are slightly separated from each other to give a wider bearing for the pinion-like shank 5 and are either bent a little or set so as to spread their winged ends when not within the case beyond the diameter of the said case. When inserted in the case, the winged ends are compressed together to bring the racks substantially parallel to each other, but under tension, whereby the employment of special friction devices is rendered unnecessary. The pressure of the winged ends on the inside of the case will cause the bolt to remain in whatever position it may be set, the said wings constituting a frictional device that is integral with the rack.

The operation is the same as other bolts of this class, excepting that I get a broad bearing for the pinion-like shank, in connection with a sheet-metal rack formed separately from the bolt, and that the retaining friction is produced by an integral part of the rack itself instead of by a special friction device.

I claim as my invention—

1. In a rack-and-pinion door-bolt, the combination of the cylindrical bolt-body with two separately-formed sheet-metal rack members secured thereto, and separated from each other, substantially as described.

2. In a rack-and-pinion door-bolt, the bolt having a double rack with outwardly-extended friction-wings, substantially as described.

3. The combination of the case, with the thumb-turn having a pinion-like shank, the bolt-body, and a rack provided with integral frictional devices held under tension by the said case, substantially as described.

HENRY G. VOIGHT.

Witnesses:
M. S. WIARD,
W. E. WIGHTMAN.